United States Patent [19]
Stadtfeld et al.

[11] Patent Number: 5,716,174
[45] Date of Patent: Feb. 10, 1998

[54] TOOL FEEDING METHOD

[75] Inventors: Hermann J. Stadtfeld; James S. Gleason, both of Rochester, N.Y.

[73] Assignee: The Gleason Works, Rochester, N.Y.

[21] Appl. No.: 705,475

[22] Filed: Aug. 29, 1996

[51] Int. Cl.$^6$ ........................................... B23F 9/14
[52] U.S. Cl. ........................................... 409/26; 451/47
[58] Field of Search ........................ 409/10, 12, 13, 409/25, 26, 27, 28, 50, 51, 43; 451/47

[56] References Cited

U.S. PATENT DOCUMENTS

| | | | |
|---|---|---|---|
| 2,114,627 | 4/1938 | Carlsen | 409/5 |
| 4,575,285 | 3/1986 | Blakesley | 407/115 |
| 4,981,402 | 1/1991 | Krenzler et al. | 409/26 |
| 5,044,127 | 9/1991 | Ryan | 451/47 |
| 5,116,173 | 5/1992 | Goldrich | 409/13 |
| 5,310,295 | 5/1994 | Palmateer, Jr. et al. | 409/13 |

FOREIGN PATENT DOCUMENTS

| | | |
|---|---|---|
| 0059992 | 9/1982 | European Pat. Off. . |
| 590104 | 7/1977 | Switzerland . |
| 590105 | 7/1977 | Switzerland . |

OTHER PUBLICATIONS

Goldrich, Robert N., "CNC Generation of Spiral Bevel and Hypoid Gears: Theory and Practice", The Gleason Works, Rochester, New York, 1990.

*Primary Examiner*—William R. Briggs
*Attorney, Agent, or Firm*—Robert L. McDowell; Ralph E. Harper

[57] ABSTRACT

A method of feeding a tool to a predetermined depth in a workpiece in a machining process for producing at least one tooth surface on the workpiece. The workpiece being rotatable about a work axis and the tool being rotatable about a tool axis and includes at least one stock removing surface. The method comprises rotating the tool about the tool axis and contacting the rotating tool and the workpiece. The tool is fed relative to the workpiece along a feedpath to the predetermined depth wherein at least a portion of the feedpath is defined by a feed vector comprising at least first and second feed vector components. The first and second feed vector components are positioned in a plane defined by the work axis and the direction of the tool axis with the first feed vector component being substantially in the direction of the tool axis and the second feed vector component being substantially in the direction of the face width of the workpiece.

21 Claims, 3 Drawing Sheets

TOOL FEEDING METHOD

FIELD OF THE INVENTION

The present invention relates to the formation of bevel gears and the like. Particularly, the present invention is directed to a method of feeding a tool to a predetermined depth in a workpiece wherein the path of feeding is controlled.

BACKGROUND OF THE INVENTION

In the production of bevel and hypoid gears, two types of processes are commonly employed, generating processes and non-generating processes.

In generating processes a rotating tool is fed into the workpiece to a predetermined depth. Once this depth is reached, the tool and workpiece together undergo a rolling motion (i.e. a generating roll) along a path which emulates the rotation of the workpiece in mesh with a theoretical generating gear rotating about a generating gear axis with the tooth surfaces of the theoretical gear represented by the stock removing surfaces of the tool. The profile shape of the tooth is formed by relative motion of the tool and workpiece during the generating roll.

Generating processes can be divided into two categories, face milling and face hobbing. In generating face milling, each slot (adjacent tooth sides of consecutive teeth) of a workpiece is formed individually. After the formation of one tooth slot, the cutter is relatively withdrawn from the workpiece, the workpiece is indexed to the next tooth slot position, and the cutter and workpiece are engaged to form the slot. The process is repeated until all tooth slots are formed. Processes which form tooth slots individually and require cutter withdrawal and workpiece indexing are known as intermittent or intermittent-indexing processes. After the tool has been fed to its predetermined depth in the tooth slot, the generating roll is commenced.

In the generating roll, tooth surfaces may be formed by any of several known cycles. One tooth surface of a slot may formed by a forward generating roll and the adjacent tooth surface formed by a generating roll in the reverse direction. Alternatively, both sides of the tooth slot may be cut in a single forward generating roll and if a secondary or finishing cut is required, this may be accomplished by a reverse roll to produce the desired tooth surfaces. Once the tooth sides are completed, the tool is withdrawn relative to the workpiece and the workpiece is then indexed to the next slot position. This intermittent indexing is continued until all tooth surfaces on the workpiece are formed.

Generating face hobbing is a continuous indexing process wherein a predetermined timed rotation between the tool and workpiece is superimposed on the generating roll. In this manner, all slots (and therefore all tooth surfaces) on the workpiece are formed by a single generating roll. The tool and workpiece are rotated in a timed relationship and the tool is then fed into the workpiece thus removing stock from all slots as it is fed to depth. Once full depth is reached, the desired generating cycle is commenced to completely form all teeth on the workpiece.

Non-generating processes, either intermittent indexing or continuous indexing, are those in which the profile shape of a tooth on a workpiece is produced directly from the profile shape on the tool. The tool is fed into the workpiece and the profile shape on the tool is imparted to the workpiece. While no generating roll is employed, the concept of a theoretical generating gear known as a "crown gear" is applicable in non-generating processes. The crown gear is that theoretical gear whose tooth surfaces are complementary with the tooth surfaces of the workpiece. Therefore, the cutting blades on the tool represent the teeth of the crown gear when forming the tooth surfaces on the non-generated workpiece.

In face milling, the tool usually comprises a circular cutter having a plurality of stick-type cutting blades projecting from the surface thereof. The cutting blades may be outside cutting blades whose side cutting edges produce the concave surface in the lengthwise direction of a gear tooth, or, the cutting blades may be inside cutting blades whose side cutting edges form the convex surface in the lengthwise direction of the gear tooth. Also, the face milling tool may comprise alternating outside and inside blades which form both sides of the tooth slot. Since each tooth slot is formed individually in face milling, all blades of the cutter pass through each slot during its formation.

In face hobbing, outside blades and inside blades (and in some cases, a third blade known as a "bottom" blade) are arranged in groups in the cutter head. The groups are positioned such that each group cuts a successive tooth slot as the tool and workpiece are rotated in the timed relationship during cutting. In this manner, all tooth slots are formed essentially simultaneously with a single plunge of the cutting tool.

In non-generating and generating processes, the first step is to engage the cutting or grinding tool with the workpiece and then feed the tool to the predetermined depth in the workpiece. The tool may be moved toward the workpiece, the workpiece may be moved toward the tool, or, both the tool and workpiece may be moved toward one another. Regardless of which of the tool and/or workpiece is moved, the tool must reach its predetermined plunge depth in the workpiece before the stock removal is complete and the tool withdrawn (non-generating processes) or the generating roll is commenced (generating processes).

The path along which the tool travels from its initial contact with the workpiece to its predetermined or "full" depth may vary. As discussed by Goldrich in "CNC Generation Of Spiral Bevel and Hypoid Gears: Theory and Practice", The Gleason Works, Rochester, N.Y., 1990, in conventional mechanical gear cutting and/or grinding machines comprising a cradle, which emulates the theoretical generating gear, the feedpath is in a direction along the cradle (generating gear) axis. While this type of tool feeding is well established, uneven tool loads or stresses have been noted.

The same Goldrich publication also discloses a CNC multi-axis gear generating machine wherein the feedpath of a tool into a workpiece may be in a direction along the tool axis. In feeding along the tool axis, the feedpath lies in a plane defined by the tool axis and a tooth normal vector at the design point (the point around which the geometry of the tooth is calculated). This plane is referred to as the "normal plane". The design point is usually the mean point of the tooth, the mean point being a point midway root-to-top and toe-to-heel on the tooth. This type of feeding is advantageous in cases where tool entrapment may occur when the feedpath is along the cradle axis. Tool entrapment is the condition whereby the tool removes excess stock material due to its particular presentation and motion relative to the workpiece. Feeding along the tool axis presents the tool to the workpiece in a manner that tool entrapment is prevented. However, feeding along the tool axis has exhibited excessive uneven tool loads especially in generating face hobbing processes.

Goldrich further discloses that feeding of the tool may take place at an angle relative to the tool axis in order to balance chip loads for cutting blades having unequal pressure angles. When cutting tools having unequal pressure angles are utilized, one side of the blades may remove more stock material than the other side thus causing one set of blades to wear faster than the other set of blades. When feeding a tool along the tool axis, the condition of uneven tool loads is further aggravated by utilizing tools having such unequal pressure angles. In this situation, the feedpath may be changed to an angle relative to the tool axis, but, the feedpath remains within the normal plane. This angled feedpath within the normal plane allows the tool to contact the workpiece in a manner such that stock removal between the two sides of the tool is balanced and blade wear due to unequal stock removal is alleviated.

U.S. Pat. No. 5,310,295 to Palmateer, Jr., et al. discloses a method of feeding a tool relatively into a workpiece along a feedpath at least a portion of which comprises a feed vector having first and second components positioned in an axial plane. The axial plane is defined by the axis of the theoretical generating gear and the workpiece axis. The first feed vector component is in the direction of the theoretical generating gear axis and the second feed vector component is substantially perpendicular to the axis of the theoretical generating gear. The tool feeding process reduces uneven tool loads and decreases machine vibrations.

However, feeding the tool with a balanced chip load generally in the direction of the theoretical generating gear does not consistently reduce machine vibrations a significant amount and usually results in excessive blade wear being noted on the secondary cutting edge of the first blade in each blade group, especially in face hobbing processes.

Although the chip load is geometrically balanced in the prior art methods discussed above, the first cutting blade in a blade group, for example an outside blade, removes material out of the tooth slot not only with its outer cutting edge but also with the tip portion and a small section of the clearance side edge near the blade tip as it cuts to a new depth as a result of the cutter in-feed. The section of the clearance side which removes material is also referred to as a "secondary cutting edge."

The inventors have discovered that non-optimal cutting forces acting on the blades in a slot is a significant source of machine vibration and tool wear especially with respect to the "first blade," that is, the first blade cutting a new slot or the first blade cutting at a new depth in a slot. This is believed due to the first blade being the most exposed to non-optimal and excessive cutting action because the first blade removes more stock than any blade which follows in the same tooth depth position. The prior art feeding methods discussed above do not address the secondary cutting edge and chip balancing disclosed in these documents is geometric and is directed to balancing the chip load of the cutting blades.

It is an object of the present invention to reduce the chip load on the secondary cutting edge of the first blade thereby reducing blade wear and the process induced vibrations.

SUMMARY OF THE INVENTION

The present invention is directed to a method of feeding a tool to a predetermined depth in a workpiece in a machining process for producing at least one tooth surface on the workpiece. The workpiece is rotatable about a work axis and the tool is rotatable about a tool axis and includes at least one stock removing surface.

The method comprises rotating the tool about the tool axis and contacting the rotating tool and the workpiece. The tool is fed relative to the workpiece along a feedpath to the predetermined depth wherein at least a portion of the feedpath is defined by a feed vector comprising at least first and second feed vector components. The first and second feed vector components are positioned in a plane defined by the work axis and the direction of the tool axis with the first feed vector component being substantially in the direction of the tool axis and the second feed vector component being substantially in the direction of the face width of the workpiece.

In performing the inventive method on a multi-axis computer controlled machine, initial axes setup positions are calculated in response to setup parameters input to the machine. The computer controlled axes are then moved to the initial setup positions for initially positioning the tool and work gear with respect to each other. A feedpath of the tool relative to the work gear is calculated in response to feed parameters input to the machine. The tool is then rotated about the tool axis and the computer controlled axes are moved to feed the rotating tool relative to the work gear along the feedpath to a predetermined depth in the work gear. At least a portion of the feedpath is defined by a feed vector comprising at least first and second feed vector components as defined above.

DETAILED DESCRIPTION OF THE PREFERRED EMBODIMENT

The present invention will be discussed in detail with reference made to the accompanying drawing figures. In all figures, similar features or components will be referenced by like reference numbers.

Figure 1:
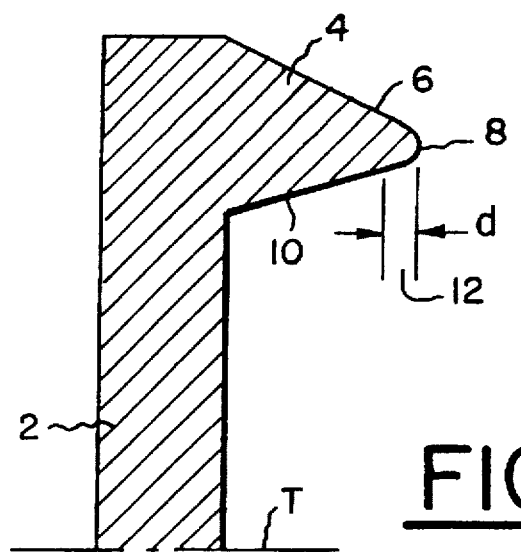
FIG. 1 shows an axial cross-sectional representation of a cutting tool.

FIG. 1 illustrates a partial axial cross-section of a stock removing tool 2 having an axis of rotation T. For discussion purposes, the tool 2 shall be hereafter designated a cutting tool but it to be understood that grinding tools are also contemplated by and included in the present invention. The tool 2 includes a cutting blade 4 projecting from a surface of the tool 2 such as the type disclosed in U.S. Pat. No. 4,575,285 to Blakesley et al., for example. For the sake of example, cutting blade 4 shall be deemed an outside blade and therefore includes a cutting edge 6, a tip radius 8, and a clearance edge 10. While outside blades are described, it is noted that the present discussion applies equally to inside cutting blades.

The inventors have noted that significant machine vibration and tool wear is caused by excessive loads being placed upon a portion 12 of the clearance edge 10 adjacent to tip radius 8. This portion of the clearance edge is referred to as the secondary cutting edge. This is noted particularly with respect to the first cutting blade to pass through a tooth slot at any new position in the slot depth resulting from feeding the tool to its predetermined depth in the workpiece slot. Even with edge 10 being a "clearance" edge, if blade 4 is the first blade through a particular slot depth location it will encounter stock material with not only its cutting edge 6 but also with tip radius 8 and a portion of the clearance edge 10, i.e. secondary cutting edge 12.

The amount of wear noted on the secondary cutting edge of a subsequent blade (e.g. an inside blade) passing through the same slot position is considerably less since the secondary cutting edge of the inside blade would have little or no stock material to remove because the stock has previously been removed by the secondary cutting edge of the preceding outside cutting blade. The secondary cutting edge 12 shows the first wear noted on a cutter and is, therefore, a limiting factor with regard to tool life. The vibration and wear are noted primarily in face hobbing processes of both generating and non-generating types, however, face milling processes also exhibit similar vibration and wear.

The length of secondary cutting edge 12 can be determined by the equation:

$$d = \frac{\text{feed rate per tool rotation}}{n_{tool}} \times n_{work}$$

where:

d=length of secondary cutting edge $n_{work}$=number of teeth on work gear $n_{tool}$=number of blade groups on cutter.

Figure 2:
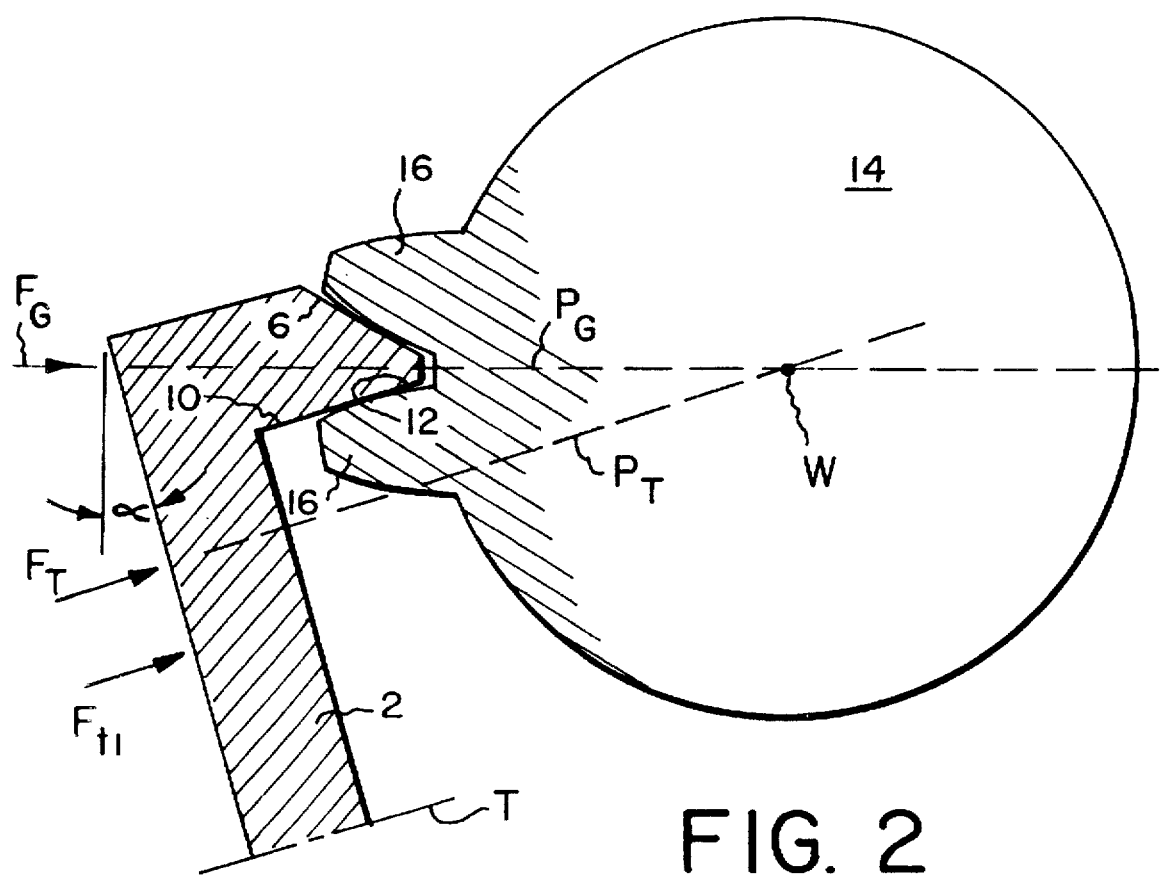
FIG. 2 illustrates the inventive feed vector and a prior art feed vector in a radial cross-sectional view of a pinion member engaged with a cutting tool

FIG. 2 shows a radial cross-sectional view of the cutting tool 2 engaging a work gear 14 having an axis W and on which only two consecutive teeth 16 have been illustrated for explanatory purposes. In this figure, the cutter 2 is shown tilted by an amount α to effect lengthwise crowning of the teeth 16. Feed vector $F_G$ illustrates the feed vector disclosed in previously discussed U.S. Pat. No. 5,310,295 and lies in a plane $P_G$ defined by the theoretical generating gear axis and work gear axis W. The inventors have discovered that feeding the tool 2 relative to the work gear 14 along a feedpath at least partially comprising feed a vector $F_T$ significantly reduces the wear on secondary cutting edge 12 and also reduces machine vibration associated with the excessive cutting action undertaken by the secondary cutting edge 12. Feed vector $F_T$ lies in a plane $P_T$ defined by the work gear axis W and the direction of tool axis T.

Figure 3:
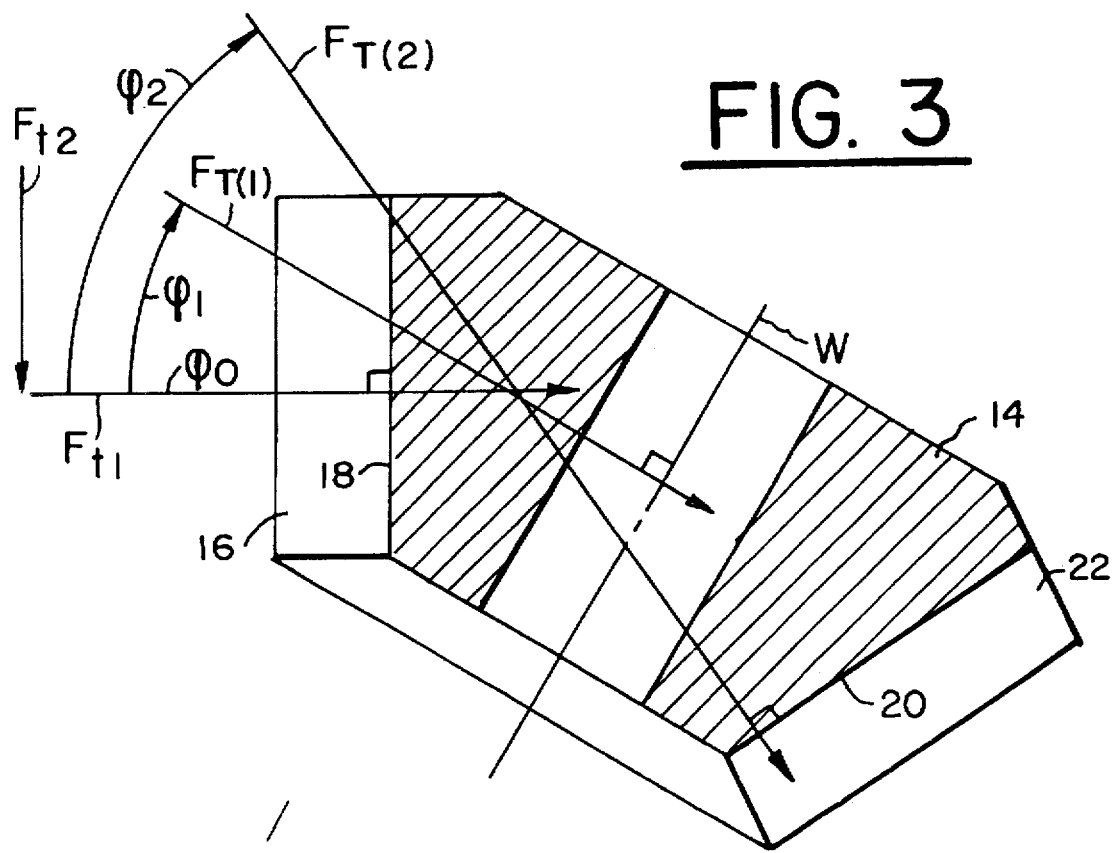
FIG. 3 illustrates the components of the inventive feed vector in an axial cross-sectional view of a pinion member.

FIG. 3 is an axial cross-sectional view of work gear 14 taken in plane $P_T$ and illustrates the components of inventive feed vector $F_T$. The first feed vector component $F_{t1}$ extends in the direction of the tool axis T (see FIG. 2 also). Preferably, first feed vector component $F_{t1}$ is oriented perpendicular to the root line 18 of the tooth but may vary up to ±5 degrees form perpendicular due to corrective settings of the cutting tool. The second feed vector component $F_{t2}$ extends in the direction of the face width of work gear 14.

A preferred orientation of the inventive feed vector $F_T$ in plane $P_T$ lies between (and inclusive of) orientations $\phi_1$ ($F_{T(1)}$) perpendicular to work gear axis W and equal to the root angle of the work gear, and orientation $\phi_2$ ($F_{T(2)}$) perpendicular to the root direction 20 of opposite tooth slot 22 and equal to twice the root angle of the work gear, the angles being with respect to first feed vector component $F_{t1}$ which is angularly designated $\phi_0$. In situations where feeding along a vector between $\phi_1$ and $\phi_2$ results in an interference between the tool 2 and the tooth 16 such that the desired tooth form cannot be realized, it has been found that incrementally adjusting the angular orientation $\phi$ of the feed vector in a direction toward $\phi_0$ ($F_{t1}$) gradually reduces and eventually eliminates the interference. The occurrence of interference between angles $\phi_1$ and $\phi_2$ tends to be more frequent with lower ratio gear sets (i.e. about 3.5 or less, for example).

As an example, the pinion member of the following gear set was machined:

number of teeth in pinion=11 number of teeth in gear=39 gear/pinion ratio=3.5:1 root angle of pinion=28.6°

Given the above discussion and referring to FIG. 3, angle $\phi_1$ is equal to the root angle of the workpiece (i.e. 28.6°) and the angle $\phi_2$ is equal to twice the root angle of the work gear (i.e. 57.2°). Therefore, feeding of the tool into the workpiece initially took place between these two angles. However, an initial feedpath oriented at about 30° resulted in interference which was not unexpected given the low ratio of 3.5:1. The angle of tool feeding was incrementally decreased in intervals of two (2) degrees until a feed angle $\phi$ of 24° resulted in no interference.

Conversely, it has been discovered that even in situations where the feed vector $F_T$ initially lies between $\phi_1$ and $\phi_2$ with no interference occurring, incremental adjustment of the feed vector $F_T$ toward $\phi_2$ may result in reduced machine noise and vibration.

As an example of the above, the pinion member of the following gear set was machined:

number of teeth in pinion=6 number of teeth in gear=37 gear/pinion ratio=6.2:1 root angle of pinion=12.68°

Given the previous discussion and referring to FIG. 3, angle $\phi_1$ is equal to the root angle of the workpiece (i.e. 12.68°) and the angle $\phi_2$ is equal to twice the root angle of the work gear (i.e. 25.36°). Therefore, feeding of the tool into the workpiece initially took place between these two angles. However, an initial feedpath oriented at $\phi_1$ resulted in no interference which was expected given the higher ratio of 6.2:1. However, machine noise and vibration were detected and, therefore, the angle of tool feeding was increased to about 14° with little change. Thereafter, further increases in intervals of two (2) degrees were performed until a feed angle $\phi$ of 22° resulted in substantially no machine noise or vibration.

Based on the results obtained in the above examples, a range of feed angles $\phi$ of about 22° to about 24° with respect to $F_{t1}$ is most preferred for feed vector $F_T$. For most gear sets, this range lies between angles except, as stated above, in those cases where an interference occurs in lower ratio gear sets. In those instances, the feed angle range may overlap or lie outside of the lower limit angle $\phi_1$.

Of course, the experimental method of determining the optimum feed vector (described above) may be replaced by comparing the desired form of the tooth slot with the tooth slot calculated based on the orientation of the inventive feed vector. This comparison may be conducted using commercially available software such as T2000 available from The Gleason Works. With this method of comparison, numerous machining trials may be avoided and unacceptable workpieces are not produced in an effort to find the optimum feed vector orientation.

Figure 4:
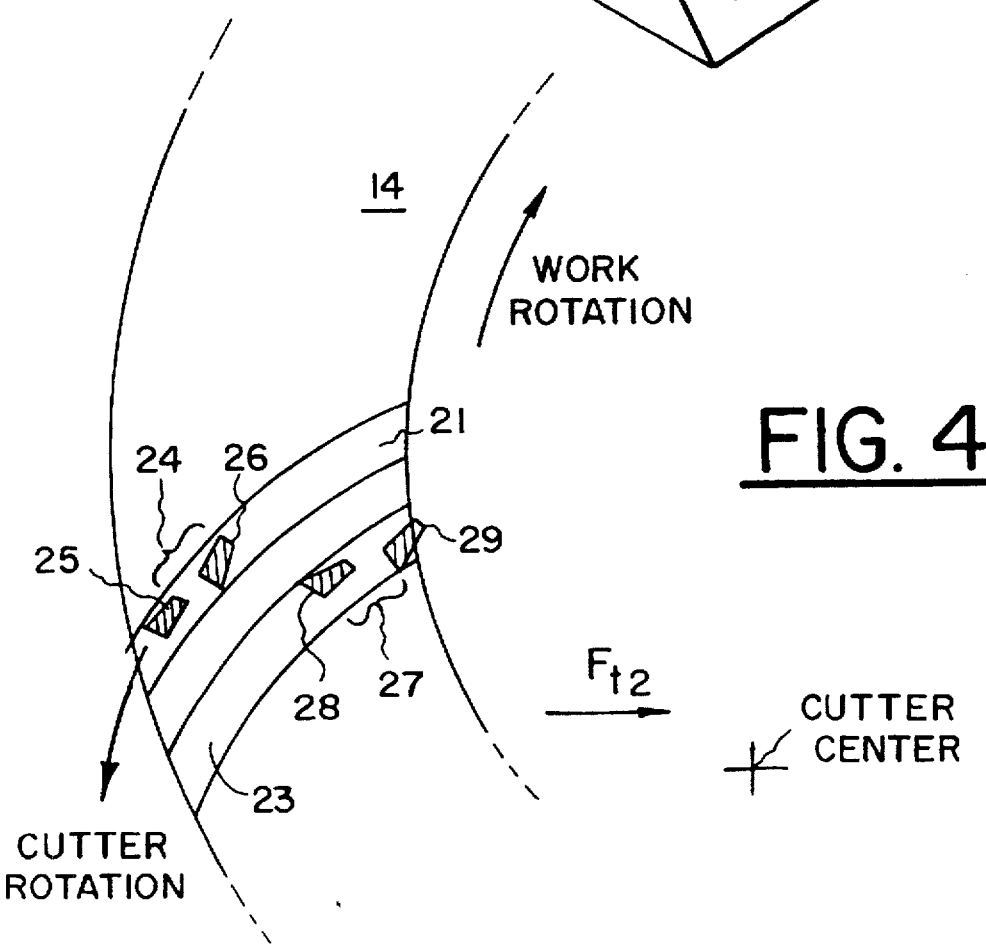
FIG. 4 shows one component of the inventive feed vector directed along the face width of a gear.

FIG. 4 shows a face hobbing process viewed in a face plane of the work gear 14 with tool feeding according to the present invention. As stated above, in face hobbing the work gear and cutter rotate in a timed relationship and the cutter comprises a plurality of blade groups such that each successive blade group enters successive tooth slots. In FIG. 4 successive tooth slots are identified by 21 and 23. As the cutter and work gear rotate, first blade group 24 comprising outside blade 25 and inside blade 26 enters slot 21. Second blade group 27 comprising outside blade 28 and inside blade 29 then enters slot 23. Without the feeding method of the present invention, the secondary cutting edge of the first blade through the slot (i.e. blades 25 and 28) is exposed to much cutting action since there has been no blade preceding it, at the particular tooth slot depth, to remove stock material at that depth. Secondary cutting edges on inside blades 26 and 29 show little wear since they contact less stock because the previous outside blades have already removed much of the stock material from the slot. Therefore, the secondary cutting edge on the first blade through the slot wears fastest and the high cutting forces cause vibrations in the machine.

The present invention, however, effects a shift in the cutting blades as they pass through the tooth slot due primarily to the second feed component $F_{r2}$ of the inventive feed vector $F_T$. This component effects a shift of the outside blades away from the tooth flank and the inside blades toward the tooth flank thereby moving more of the chip load to the inside blades and in particular, the cutting edge of the inside blades. With the inside blades having a greater chip load, there is less stock material present for the secondary cutting edge of any successive outside blades to remove even at a greater tooth depth position because a preceding inside blade has taken a greater amount of material from the tooth slot. With the inventive method, there is a kinematic balancing effected between both blades, and hence all cutting edges of the blades, which form a tooth slot. Also, the feed motion in the direction of feed vector component $F_{r2}$ along the face width of the work gear introduces a sliding motion similar to the length sliding motion of hypoid gears. This sliding motion acts as a vibration dampener to reduce machine vibrations.

Figure 5:
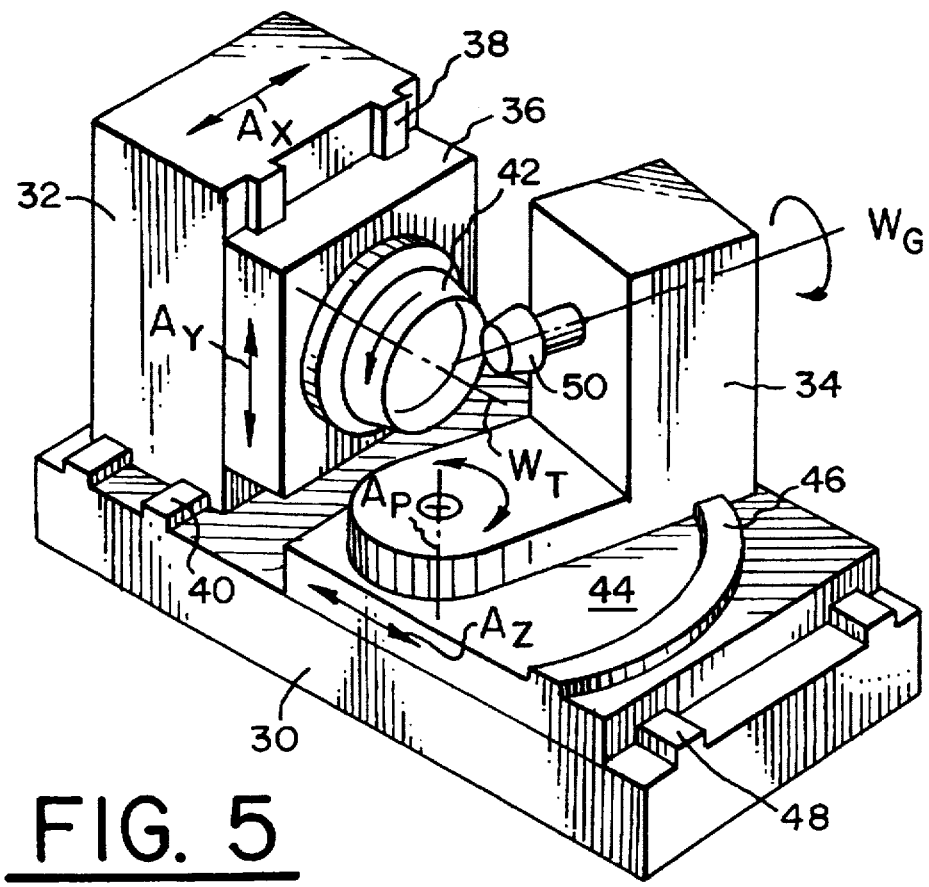
FIG. 5 schematically illustrates a computer controlled multi-axis gear manufacturing machine.

The inventive method is preferably carried out on a computer controlled machine comprising a plurality of computer controlled axes for positioning and operatively engaging the tool with the work gear. Such a machine is shown in FIG. 5 which schematically represents a free-form computer controlled multi-axis gear manufacturing machine of the type disclosed by U.S. Pat. No. 4,981,402 to Krenzer et al.

The machine comprises a machine base 30, tool head 32, and work head 34. Tool slide 36 is mounted for linear movement ($A_y$) to tool head 32 via ways 38 and tool head 32 is mounted for linear movement ($A_x$) to machine base 30 via ways 40. Tool 42 is mounted to tool slide 36 and is rotatable about tool axis $W_T$. Work head 34 is mounted for arcuate (pivoting) movement ($A_p$) to work table 44 via way 46 and work table 44 is mounted for linear movement ($A_z$) to machine base 30 via ways 48. Work gear 50 is mounted to work head 34 and is rotatable about work gear axis $W_G$.

The machine motions necessary for the present invention are carried out in response to instructions input to the computer for such things as machine setup, tool feeding, and, if required, generating roll. Initial setup positions are computed and the computer controlled axes are moved to the setup positions. A feedpath of the tool relative to the workpiece is then computed in response to feed parameters such as the $A_x$, $A_y$, and $A_z$ coordinates. The computer controlled axes are then moved to feed the tool relative to the workpiece along the feedpath at least a portion of which comprises a feed vector as described above. If the process is of the generating type, the computer controlled axes may also be moved in a manner wherein a generating roll is carried out and/or the workpiece may also be rotated in a timed relationship with the tool in order that a face hobbing process may be performed.

In machines of the type shown in FIG. 5, a tool feed vector in the plane defined by the work gear axis and the direction of the tool axis lies in a horizontal plane due to the orientation of the tool axis $W_T$ which is always parallel to the machine base and the work gear axis $W_G$ which is fixed parallel to the machine base. It can therefore be seen that feeding a tool into a work gear would take place with no movement in the vertical direction which is advantageous as discussed below.

The most significant component of cutting forces in machine tools is in the vertical direction. Horizontal movement along one or two slide ways (e.g. 40 and/or 48 in FIG. 5) are perpendicular to the vertical cutting force components which presents an optimal condition for machine tools. When the tool feed vector includes a vertical component or the feed employs additional rotations of the work gear or generating gear, the machine performance is lessened. Vertical forces act against vertical movement of slide ways and also directly against dynamically sensitive elements such as gears and ball spindles that effect vertical movement of the slides. These vertical movements induce additional vibrations which negatively affect the machining process.

Figure 6:
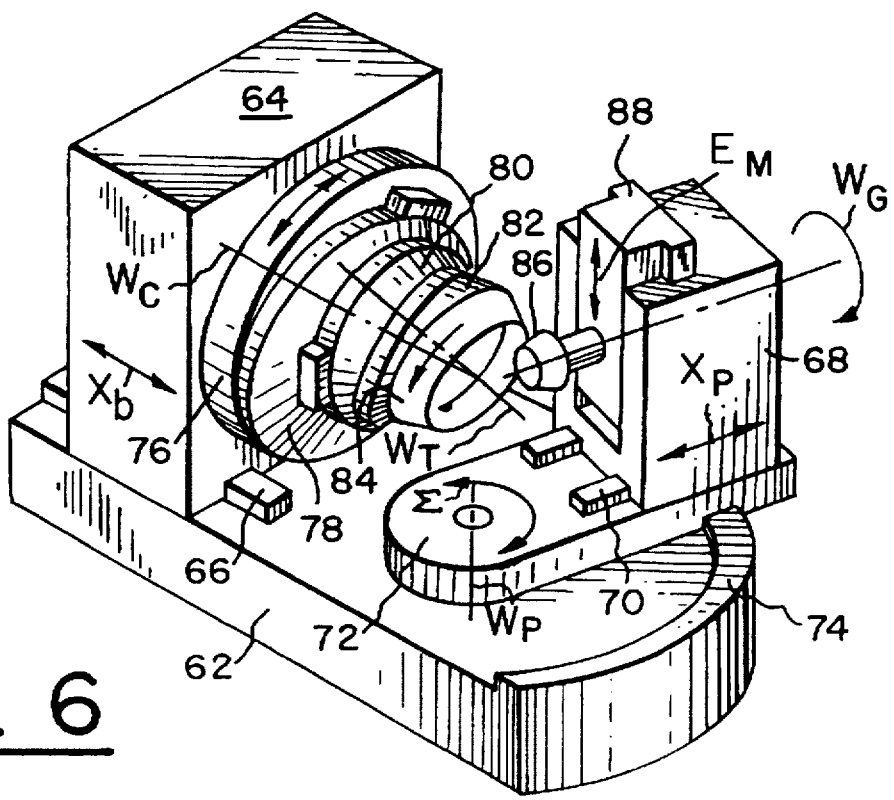
FIG. 6 schematically illustrates a cradle style gear manufacturing machine.

The inventive method may also be carried out on a mechanical or computer controlled cradle style machine such as shown in FIG. 6 by choosing the cradle position for the plunge feed in order to orient the tilted tool relative to the feed axis in a position so the feed vector lies in the plane defined by the work gear axis and the direction of the cutter axis.

FIG. 6 illustrates a mechanical or computer controlled cradle-style gear machine comprising a machine base 62, a tool head 64 linearly movable ($X_b$) on ways 66 attached to machine base 62. The machine also includes a work head 68 linearly movable ($X_p$) on ways 70 attached to work table 72 which is movable in an arcuate path $\Sigma$ on way 74 about pivot axis $W_p$. Mounted on tool head 64 is a cradle 76 which is rotatable about cradle axis $W_C$ and attached to cradle 76 is a series of adjustable drums 78, 80, and 82 which control the eccentric, swivel, and tilt angles respectively. These drums are set to position the tool 84, rotatable about tool axis $W_T$, in an appropriate manner with respect to the work gear 86. Work head 68 includes slide 88 which in turn carries work gear 86 rotatable about work axis $W_G$. Slide 88 is positioned and set to the desired hypoid offset distance $E_m$.

The cradle 76 or swivel 80 settings could be employed to orient the tilted cutter to achieve the inventive feed vector since these settings enable the positioning of the cutter axis in a horizontal plane therefore enabling the establishment of a horizontal feed plane which is advantageous as discussed above. The means for orienting the tilt relative to the feed axis can also be the swivel mechanism 80 which is normally just used to give the tilted cutter an orientation relative to the work gear to generate the proper tooth form. This swivel rotation has in this case a double function which first provides an optimal tilt orientation for the plunge cycle, and secondly, changes the tilt position in order to form the proper tooth shape.

The present inventive tool feeding method enables a higher tool life to be attained as well as an improvement in the performance of the particular machine. In addition, the surface finish of the gears being machined is improved regardless of the type of process, i.e. cutting or grinding, face hobbing or face milling, generated or non-generated.

Regardless of the type of stock removing process, the present inventive feeding method is applicable since, for all types of cutting or grinding processes, the tool must first be fed into the workpiece along a feedpath to a desired depth.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of feeding a tool to a predetermined depth in a workpiece in a machining process for producing at least one tooth surface on said workpiece, said tool being rotatable about a tool axis and having at least one stock removing surface, said workpiece being rotatable about a work axis, said method comprising:

rotating said tool about said tool axis, contacting said rotating tool and said workpiece, feeding said tool relative to said workpiece along a feedpath to said predetermined depth, wherein at least a portion of said feedpath is defined by a feed vector comprising at least first and second feed vector components, said first and second feed vector components being positioned in a plane defined by said work axis and the direction of said tool axis, said first feed vector component being substantially in the direction of said tool axis and said second feed vector component being substantially in the direction of the face width of said workpiece.

2. The method of claim 1 including rotating said workpiece about said work axis prior to said contacting, said tool and workpiece rotating in a predetermined timed relationship whereby tooth surfaces of all teeth on said workpiece are formed during said rolling motion.

3. The method of claim 1 wherein said feedpath is substantially completely defined by said feed vector.

4. The method of claim 1 wherein said machining process comprises a cutting process for forming a member of a gear set.

5. The method of claim 4 wherein said gear cutting process comprises a generating process.

6. The method of claim 4 wherein said gear cutting process comprises a non-generating process.

7. The method of claim 1 wherein said machining process comprises a grinding process for finishing a member of a gear set.

8. The method of claim 7 wherein said gear grinding process comprises a generating process.

9. The method of claim 7 wherein said gear grinding process comprises a non-generating process.

10. The method of claim 1 wherein said workpiece comprises a pinion member of a gear set.

11. The method of claim 1 wherein said workpiece comprises a gear member of a gear set.

12. The method of claim 1 wherein said method is carried out on a machine having a base wherein said plane is oriented horizontally with respect to said base.

13. The method of claim 12 wherein said machine is a computer controlled multi-axis machine.

14. The machine of claim 12 wherein said machine comprises a cradle.

15. A method of feeding a tool relative to a work gear in a process for forming spiral bevel and hypoid gears with a computer controlled machine, said computer controlled machine comprising a plurality of computer controlled axes for positioning and operatively engaging said tool with said work gear, said tool being arranged for rotation about a tool axis and said work gear being arranged for rotation about a work axis, said method comprising the steps of:

computing initial setup positions in response to setup parameters input to said machine, moving said computer controlled axes to initial setup positions for initially positioning said tool and work gear with respect to each other, computing a feedpath of said tool relative to said work gear in response to feed parameters input to said machine, rotating said tool about said tool axis, moving said computer controlled axes to feed said rotating tool relative to said work gear along said feedpath to a predetermined depth in said work gear, at least a portion of said feedpath being defined by a feed vector, wherein said feed vector comprises at least first and second feed vector components, said feed vector components being positioned in a plane defined by said work axis and the direction of said tool axis, said first feed vector component being substantially in the direction of said tool axis and said second feed vector component being substantially in the direction of the face width of said work gear.

16. The method of claim 15 wherein said process for forming bevel and hypoid gears comprises face milling.

17. The method of claim 15 wherein said process for forming bevel and hypoid gears comprises face hobbing.

18. The method of claim 15 wherein said feedpath is substantially completely defined by said feed vector.

19. A method of feeding a tool to a predetermined depth in a work gear in a face hobbing process for producing bevel and hypoid gears, said tool being rotatable about a tool axis and having a plurality of stock removing surfaces, said work gear being rotatable about a work axis, said method comprising:

rotating said tool about said tool axis, rotating said work gear about said work axis, said tool and work gear rotating in a timed relationship, contacting said rotating tool and said rotating workpiece, feeding said tool relative to said workpiece along a feedpath to said predetermined depth, wherein at least a portion of said feedpath is defined by a feed vector comprising at least first and second feed vector components, said feed vector components being positioned in a plane defined by said work axis and the direction of said tool axis, said first feed vector component being substantially in the direction of said tool axis and said second feed vector component being substantially in the direction of the face width of said workpiece.

20. The method of claim 19 wherein said feedpath is substantially completely defined by said feed vector.

21. The method of claim 19 wherein said face hobbing process is a generating face hobbing process.

* * * * *